(12) United States Patent
Kawasaki et al.

(10) Patent No.: US 11,767,224 B2
(45) Date of Patent: *Sep. 26, 2023

(54) METHOD FOR PRODUCING SILICA SOL

(71) Applicant: FUJIMI INCORPORATED, Kiyosu (JP)

(72) Inventors: Yusuke Kawasaki, Kiyosu (JP); Shogo Tsubota, Kiyosu (JP); Masaaki Ito, Kiyosu (JP); Jun Shinoda, Kiyosu (JP); Keiji Ashitaka, Kiyosu (JP)

(73) Assignee: FUJIMI INCORPORATED, Kiyosu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/950,784

(22) Filed: Sep. 22, 2022

(65) Prior Publication Data
US 2023/0056027 A1 Feb. 23, 2023

Related U.S. Application Data

(63) Continuation of application No. 16/818,114, filed on Mar. 13, 2020, now Pat. No. 11,518,682.

(30) Foreign Application Priority Data

Mar. 28, 2019 (JP) .................. 2019-064654

(51) Int. Cl.
  *C01B 33/145* (2006.01)
  *C01B 33/141* (2006.01)
  *C01B 33/14* (2006.01)

(52) U.S. Cl.
  CPC .......... *C01B 33/145* (2013.01); *C01B 33/141* (2013.01); *C01B 33/1412* (2013.01);
  (Continued)

(58) Field of Classification Search
  None
  See application file for complete search history.

(56) References Cited

U.S. PATENT DOCUMENTS

| 4,983,369 A | 1/1991 | Barder et al. |
| 11,518,682 B2 * | 12/2022 | Kawasaki ........... C01B 33/1412 |
| 2019/0010059 A1 | 1/2019 | Ashitaka et al. |

FOREIGN PATENT DOCUMENTS

| JP | S61-158810 A | 7/1986 |
| WO | WO-2017/022552 A1 | 2/2017 |

OTHER PUBLICATIONS

Bogush et al., "Preparation of Monodisperse Silica Particles: Control of Size and Mass Fraction", J Non-Crys Sol 104 (1988), 95-106.
(Continued)

*Primary Examiner* — Colin W. Slifka
*Assistant Examiner* — Michael Forrest
(74) *Attorney, Agent, or Firm* — Foley & Lardner LLP

(57) ABSTRACT

The present invention provides a means capable of suppressing the formation of fine particles in a method for producing a silica sol. The present invention relates to a method for producing a silica sol, including synthesizing a silica sol by, in a reaction liquid containing an alkoxysilane or a condensate thereof, water, and an alkali catalyst, allowing the alkoxysilane or condensate thereof to react with the water in the presence of the alkali catalyst, wherein the alkali catalyst is not additionally supplied after the start of the synthesis until the finish time of the synthesis, and during 90% or more of the time between when 5 minutes have elapsed from the time point when the electrical conductivity of the reaction liquid reaches a local maximum for the first time and the finish time of the synthesis, the proportion of the value of the electrical conductivity of the reaction liquid is more than 90% relative to the value of the electrical conductivity at the
(Continued)

time when 5 minutes have elapsed from the time point when the local maximum is reached.

8 Claims, 3 Drawing Sheets

(52) U.S. Cl.
CPC .......... *C01B 33/14* (2013.01); *C01P 2004/03* (2013.01); *C01P 2004/62* (2013.01); *C01P 2004/64* (2013.01)

(56) References Cited

OTHER PUBLICATIONS

Han et al., "Unraveling the Growth Mechanism of Silica Particles in the Stöber Method: In Situ Seeded Growth Model." Langmuir (2017), 33, 5879-5890.
Non-Final Office Action on U.S. Appl. No. 16/818,114 dated Feb. 3, 2022.
Notice of Allowance on U.S. Appl. No. 16/818,114 dated Jun. 23, 2022.
Park et al., "Preparation of silica nanoparticles: determination of optimal synthesis conditions for small and uniform particles" Colloids and Surf A: Physicochem and Eng Aspects 197 (2002), 7-17.
Notice of Reasons for Refusal corresponding to Japanese Patent Application No. 2019-064654, dated Sep. 27, 2022 with English translation.

\* cited by examiner

EXAMPLE 1

COMPARATIVE EXAMPLE 1

METHOD FOR PRODUCING SILICA SOL

CROSS-REFERENCE TO RELATED APPLICATION

The present patent application is a continuation application of U.S. application Ser. No. 16/818,114, filed on Mar. 13, 2020, which claims priority to Japanese Patent Application No. 2019-064654, filed on Mar. 28, 2019, the entire disclosures of which are incorporated herein by reference.

BACKGROUND

1. Technical Field

The present invention relates to a method for producing a silica sol.

2. Description of Related Arts

Conventionally, as a method for producing a silica sol, a production method in which a sodium silicate solution, which is called a water glass, is used as a starting material has been known (JP-A-61-158810). In this production method, a sodium silicate solution is once treated with a cation exchange resin to remove ions such as sodium ions, thereby increasing the purity as a starting material, and then used for the production of a silica sol.

However, according to the production method described in JP-A-61-158810, the increase in purity of the starting material by ion exchange is limited.

Thus, as a method for obtaining a high-purity silica sol, a method that utilizes the hydrolysis of a high-purity alkoxysilane, such as tetraethyl ortho silicate, has been disclosed. As such a method, WO 2017/022552 (corresponding to U.S. Patent Application Publication No. 2019/010059) discloses a method for producing a silica sol, including a step of preparing a reaction liquid by mixing a liquid (B) containing an alkoxysilane or a condensate thereof and a second organic solvent and a liquid (C) containing water with a liquid (A) containing an alkali catalyst, water, and a first organic solvent. Then, it is disclosed that this production method allows for the stable production of a silica sol in which the particle size of silica particles is uniform.

SUMMARY

In recent years, there is an increasing demand for an increase in the amount of silica that can be produced per batch, thereby achieving further improved productivity. Thus, the present inventors have found that in the conventional sol-gel method for producing a silica sol, when the amount of raw materials added is increased in order to increase the amount of silica, fine particles are formed, and the homogeneity of the silica sol decreases, possibly resulting in a problem in that sufficient quality cannot be obtained.

Thus, an object of the present invention is to provide a means capable of suppressing the formation of fine particles in a method for producing a silica sol.

The above object of the present invention can be achieved by the following means.

A method for producing a silica sol, including synthesizing a silica sol by, in a reaction liquid containing an alkoxysilane or a condensate thereof, water, and an alkali catalyst, allowing the alkoxysilane or condensate thereof to react with the water in the presence of the alkali catalyst, wherein the alkali catalyst is not additionally supplied after the start of the synthesis until the finish time of the synthesis, and during 90% or more of the time between when 5 minutes have elapsed from the time point when the electrical conductivity of the reaction liquid reaches a local maximum for the first time from the start of the reaction and the finish time of the synthesis, the proportion of the value of the electrical conductivity of the reaction liquid is more than 90% relative to the value of the electrical conductivity at the time when 5 minutes have elapsed from the time point when the local maximum is reached.

As used herein, "the alkali catalyst is not additionally supplied after the start of the synthesis until the finish time of the synthesis" means that substantially no alkali catalyst is additionally supplied during this period. "Substantially no alkali catalyst is additionally supplied" means that the addition of the alkali catalyst itself, or, as is clear from the below description, the addition of a liquid containing an alkali catalyst at a concentration of more than 1 ppm based on the total mass or a liquid containing an alkali catalyst having a pH of 8.0 or more is not intentionally performed. Among them, it is preferable that completely no alkali catalyst is additionally supplied.

DETAILED DESCRIPTION

Figure 1A:
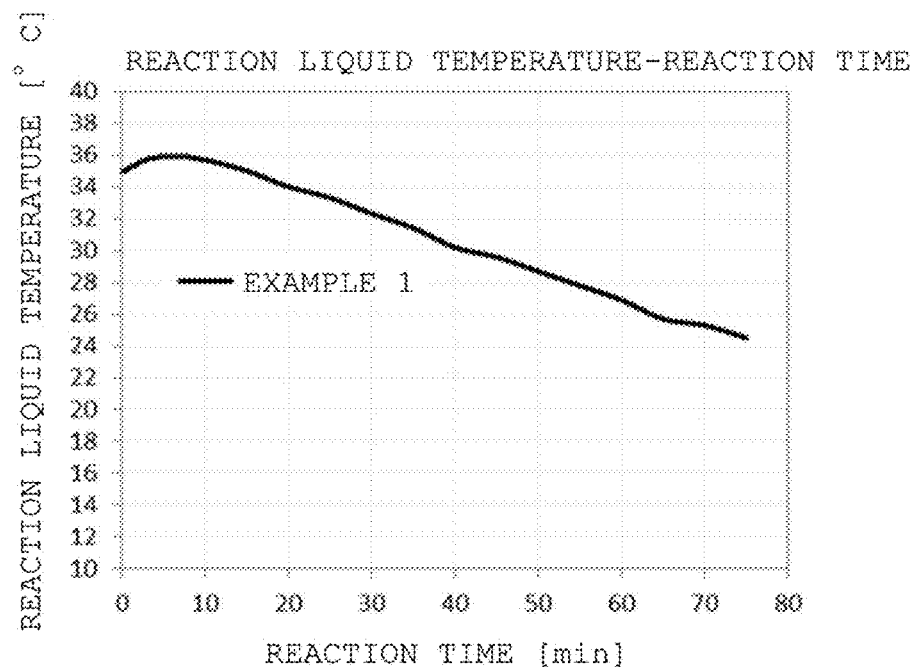
FIG. 1A is a reaction liquid temperature-reaction time graph in the production method according to Example 1.

Hereinafter, the present invention will be described. Incidentally, the present invention is not limited only to the following embodiments. As used herein, "X to Y" showing a range means "X or more and Y or less". In addition, as used herein, unless otherwise noted, the operations and the measurement of physical properties and the like are performed under conditions of room temperature (20 to 25° C.)/relative humidity of 40 to 50% RH.

Hereinafter, embodiments of the present invention will be described with reference to the attached drawings. Incidentally, in the description of drawings, same elements will be indicated with same symbols, and redundant description will be omitted.

<Method for Producing Silica Sol>

One aspect of the present invention relates to a method for producing a silica sol, the method including synthesizing a silica sol by, in a reaction liquid containing an alkoxysilane or a condensate thereof, water, and an alkali catalyst, allowing the alkoxysilane or condensate thereof to react with the water in the presence of the alkali catalyst. After the start of the synthesis until the finish time of the synthesis, the alkali catalyst is not additionally supplied, and, during 90% or more of the time between when 5 minutes have elapsed (hereinafter also simply referred to as "when 5 minutes have elapsed from the first local maximum") from the time point when the electrical conductivity of the reaction liquid reaches a local maximum for the first time from the start of reaction (hereinafter also simply referred to as "first local-maximum time point") and the finish time of the synthesis, the proportion of the value of the electrical conductivity is more than 90% relative to the value of the electrical conductivity at the time when 5 minutes have elapsed from the time point when the local maximum is reached. According to the present invention, a means capable of suppressing the formation of fine particles in a method for producing a silica sol can be provided.

With respect to the mechanism that such a configuration can suppress the formation of fine particles in a method for producing a silica sol, the present inventors surmise as follows.

In the method for producing a silica sol according to one embodiment of the present invention, for example, in the case where tetramethoxysilane is used as the raw material alkoxysilane or condensate thereof, the chemical reaction that generates a silica sol (synthesis reaction) is expressed as in the following reaction formula (1).

[Chemical Formula 1]

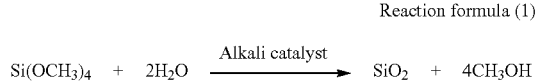

Reaction formula (1)

$$Si(OCH_3)_4 + 2H_2O \xrightarrow{\text{Alkali catalyst}} SiO_2 + 4CH_3OH$$

In the generation of a silica sol, the reaction rate is determined by tetramethoxysilane ($Si(OCH_3)_4$) as a starting material, water ($H_2O$) for hydrolysis, and an alkali catalyst as a catalyst.

An alkali catalyst dissociates itself in water or dissociates water, and yields hydroxide ions. For example, in the case where ammonia ($NH_3$) is used as an alkali catalyst, ammonia shows equilibrium as represented by the following formula in water.

[Chemical Formula 2]

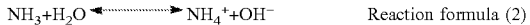

$$NH_3 + H_2O \rightleftharpoons NH_4^+ + OH^-$$ Reaction formula (2)

In a method for producing a silica sol, including allowing tetramethoxysilane to react with water in the presence of ammonia, which is an alkali catalyst, as in the production method according to WO2017/022552 (corresponding to U.S. Patent Application Publication No. 2019/010059), generally, a liquid containing tetramethoxysilane is added to a liquid containing ammonia, thereby mixing the two. In addition, in the conventional silica sol production, such as the production method according to WO 2017/022552 (corresponding to U.S. Patent Application Publication No. 2019/010059, Specification), when the amount of tetramethoxysilane-containing liquid added increases, with an increase in the total mass of the reaction liquid, the ammonia content relative to the total mass decreases, resulting in a decrease in the concentration of ammonia in the reaction liquid. Then, when the concentration of ammonia falls below a certain level, the frequency of formation of fine particles increases, and the homogeneity of the silica sol decreases. The reason for this is presumably as follows. Hydroxide ions serve to adhere the generated silica to each other. Accordingly, when the concentration of ammonia decreases in the final stage of the reaction, and the concentration of hydroxide ions also decreases, silica particles cannot grow sufficiently, resulting in the formation of fine particles.

Here, the concentration of ions in a reaction liquid and the electrical conductivity of the reaction liquid are correlated. Therefore, after the start of the reaction, in the state where the reaction is stably proceeding, when the rate of decrease in electrical conductivity is made to fall below a predetermined value, and the electrical conductivity is maintained at or higher than a predetermined proportion, the decrease in concentration of hydroxide ions also falls below a predetermined value. As a result, even in the final stage of the reaction, the silica adhesion effect of hydroxide ions can be maintained, and silica particles can grow sufficiently, whereby the formation of fine particles can be suppressed.

Incidentally, the above mechanism is based on supposition, and the present invention is not limited to the above mechanism by any means. Hereinafter, the configuration of the production method according to the present invention will be described in detail.

The production method according to one embodiment of the present invention includes synthesizing a silica sol by allowing an alkoxysilane or a condensate thereof to react with water in the presence of an alkali catalyst in a reaction liquid containing an alkoxysilane or a condensate thereof, water, and an alkali catalyst.

As such a silica sol synthesis method, any of known methods can be used without particularly limitations. Among them, methods of two-component reaction type and three-component reaction type are known. In the two-component reaction type, a liquid containing an alkoxysilane or a condensate thereof and an organic solvent (addition side) is added to a liquid containing an alkali catalyst, water, and an organic solvent (receiver side). In the two-component reaction type, the liquid containing an alkali catalyst, water, and an organic solvent on the receiver side contains all of water that serves as one of the components that determine the reaction rate. Meanwhile, in the three-component reaction type, a liquid containing an alkoxysilane or a condensate thereof and an organic solvent (addition side) and a liquid containing water (addition side) are added to a liquid containing an alkali catalyst, water, and an organic solvent (receiver side). Among them, it is more preferable that the production method according to one embodiment of the present invention is applied to a synthesis method of three-component reaction type. According to a synthesis method of three-component reaction type, the suppressing effect on the formation of fine particles can be further enhanced.

Incidentally, as used herein, in the case of a method for producing a silica sol including adding an addition-side liquid to a receiver-side liquid, such as a method of two-component reaction type or three-component reaction type, "start of the synthesis" means that the addition is started. In addition, in this case, "start time of the synthesis" means the time point when the addition is started, and "after the start of the synthesis" means the time from immediately after the start of the addition. Then, in this case, "finish of the synthesis" means that the addition is finished, and "finish time of the synthesis" means the time point when the addition is finished.

The synthesis method of three-component reaction type is not particularly limited, and a known method can be used. However, it is preferable to use a synthesis method including preparing a reaction liquid by mixing a liquid (B) containing an alkoxysilane or a condensate thereof and a second organic solvent (herein also referred to as "liquid (B)") and a liquid (C) containing water (herein also referred to as "liquid (C)") with a liquid (A) containing an alkali catalyst, water, and a first organic solvent (herein also referred to as "liquid (A)"). In the reaction liquid, the alkoxysilane or condensate thereof undergoes hydrolysis and polycondensation, whereby a silica sol is generated.

[Liquid (A) Containing Alkali Catalyst, Water, and First Organic Solvent]

In the method for producing a silica sol according to one embodiment of the present invention, the liquid (A) containing an alkali catalyst, water, and a first organic solvent for use in the synthesis of a silica sol can be prepared by mixing an alkali catalyst, water, and a first organic solvent. In addition to the alkali catalyst, water, and organic solvent, the liquid (A) can also contain other components without interfering with the effects of the present invention.

As the alkali catalyst contained in the liquid (A), any of those conventionally known can be used. For the reason that the contamination with metal impurities and the like can be minimized, it is preferable that the alkali catalyst is at least one of ammonia, tetramethyl ammonium hydroxide, and other ammonium salts. Among them, in terms of the excellent catalytic action, ammonia is more preferable. Ammonia has high volatility and thus can be easily removed from the silica sol. Incidentally, the alkali catalyst may be used alone, and it is also possible to use a combination of two or more kinds.

As water contained in the liquid (A), in terms of minimizing the contamination with metal impurities and the like, it is preferable to use pure water or ultrapure water.

As the first organic solvent contained in the liquid (A), it is preferable to use a hydrophilic organic solvent. Specific examples thereof include alcohols such as methanol, ethanol, n-propanol, isopropanol, ethylene glycol, propylene glycol, and 1,4-butanediol; ketones such as acetone and methyl ethyl ketone; and the like. Among them, an alcohol is preferable as the first organic solvent. Use of an alcohol is effective in that when the silica sol is subjected to the below-described water displacement, the alcohol and water can be easily displaced by heating distillation. In addition, in terms of the recovery or recycling of organic solvents, it is preferable to use the same kind of alcohol as the alcohol resulting from the hydrolysis of the alkoxysilane. Among alcohols, in particular, it is more preferable to use at least one kind selected from the group consisting of methanol, ethanol, and isopropanol. In the case where tetramethoxysilane is used as the alkoxysilane, it is preferable that the first organic solvent is methanol. The first organic solvent may be used alone, and it is also possible to use a combination of two or more kinds.

The combination of an alkali catalyst, water, and a first organic catalyst in the liquid (A) is not particularly limited. The kind of each can be suitably changed in order to obtain particles of the desired kind and also particles having the desired characteristics, particle size, particle size distribution, and the like, and their contents can also be suitably adjusted.

In the production method according to one embodiment of the present invention, the amount of fine particles can be controlled by controlling the content of the alkali catalyst in the liquid (A). The lower limit on the content of the alkali catalyst in the liquid (A) is not particularly limited, but is in terms of further promoting the action as a hydrolysis catalyst or grain growth, that is, further enhancing the suppressing effect on the formation of fine particles, preferably 0.1 mass % or more, more preferably 0.3 mass % or more, and still more preferably 0.5 mass % or more based on the total mass of the liquid (A) (100 mass %). In addition, the upper limit on the content of the alkali catalyst in the liquid (A) is not particularly limited, but is, in terms of productivity and cost, preferably 50 mass % or less, more preferably 40 mass % or less, still more preferably 20 mass % or less, and particularly preferably 10 mass % or less.

The lower limit on the water content in the liquid (A) is adjusted according to the amount of alkoxysilane or condensate thereof used for the reaction and is not particularly limited, but is, in terms of the hydrolysis of the alkoxysilane, preferably 1 mass % or more, more preferably 5 mass % or more, and still more preferably 10 mass % or more based on the total mass of the liquid (A) (100 mass %). In addition, the upper limit on the water content in the liquid (A) is not particularly limited, but is, in terms of miscibility with the liquid (B), preferably 50 mass % or less, more preferably 40 mass % or less, and still more preferably 30 mass % or less based on the total mass of the liquid (A) (100 mass %).

The lower limit on the content of the first organic solvent is not particularly limited, but is, in terms of miscibility with the liquid (B), preferably 10 mass % or more, more preferably 20 mass % or more, and still more preferably 50 mass % or more based on the total mass of the liquid (A) (100 mass %). In addition, the upper limit on the content of the first organic solvent is not particularly limited, but is, in terms of dispersibility, preferably 98 mass % or less, more preferably 95 mass % or less, and still more preferably 90 mass % or less based on the total mass of the liquid (A) (100 mass %).

[Liquid (B) Containing Alkoxysilane or Condensate Thereof and Second Organic Solvent]

In the method for producing a silica sol according to one embodiment of the present invention, the liquid (B) containing an alkoxysilane or a condensate thereof and a second organic solvent for use in the synthesis of a silica sol can be prepared by mixing an alkoxysilane or a condensate thereof with a second organic solvent. When an alkoxysilane or a condensate thereof is dissolved in an organic solvent and then mixed with the liquid (A), the silica sol synthesis reaction proceeds more mildly, whereby the formation of a gel-like product can be further suppressed, and the miscibility can also further improve. In addition to the alkoxysilane or condensate thereof and second organic solvent, the liquid (B) can also contain other components without interfering with the effects of the present invention. However, it is preferable that the liquid (B) contains substantially no alkali catalyst, and it is particularly preferable that an alkali catalyst is not contained at all, that is, its content is 0 mass % based on the total mass of the liquid (B). When the liquid (B) contains substantially no alkali catalyst, a lack of uniformity in the alkali catalyst concentration in the reaction liquid can be suppressed, and the suppressing effect on the formation of fine particles can be enhanced. Incidentally, as used herein, "containing substantially no alkali catalyst" means that the content is 1 ppm or less based on the total mass of the liquid. Here, when the content of the alkali catalyst is 1 ppm or less based on the total mass of the liquid, such an alkali catalyst is treated as unintentionally incorporated impurities, and even when such a liquid is added after the start of the synthesis until the finish time of the synthesis, such addition is not regarded as additional supply of an alkali catalyst.

In addition, it is preferable that the liquid (B) contains substantially no water, and it is particularly preferable that water is not contained at all, that is, its content is 0 mass % based on the total mass of the liquid (B). Incidentally, as used herein, "containing substantially no water" means that the content is 0.1 mass % or less based on the total mass of the liquid.

As the alkoxysilane or condensate thereof contained in the liquid (B), any of known ones can be used without particularly limitations. Examples thereof include tetramethoxysilane, tetraethoxysilane, tetrapropoxysilane, condensates thereof, and the like. Among them, in terms of having appropriate hydrolysis reactivity, tetramethoxysilane is preferable. In addition, the alkoxysilane or condensate thereof may be used alone, and it is also possible to use a combination of two or more kinds.

As the second organic solvent contained in the liquid (B), it is preferable to use a hydrophilic organic solvent. Specific examples thereof include alcohols such as methanol, ethanol, n-propanol, isopropanol, ethylene glycol, propylene glycol, and 1,4-butanediol; ketones such as acetone and methyl ethyl ketone; and the like. Among them, an alcohol is preferable as the second organic solvent. As a result of using an alcohol, when the silica sol obtained by the synthesis is subjected to the below-described water displacement, the alcohol and water can be easily displaced by heating distillation. In addition, as the second organic solvent, in terms of the recovery or recycling of organic solvents, it is preferable to use the same kind of alcohol as the alcohol resulting from the hydrolysis of the alkoxysilane. Among alcohols, methanol, ethanol, isopropanol, and the like are more preferable. For example, in the case where tetramethoxysilane is used as the alkoxysilane, it is preferable that the second organic solvent is methanol. Further, in terms of the recovery or recycling of organic solvents, it is preferable that the second organic solvent is the same as the first organic solvent contained in the liquid (A). Incidentally, the second organic solvent may be used alone, and it is also possible to use a combination of two or more kinds.

With respect to the combination of an alkoxysilane or a condensate thereof and a second organic solvent in the liquid (B), the kind of each can be suitably changed in order to obtain particles of the desired kind and also particles having the desired characteristics, particle size, particle size distribution, and the like, and their contents can also be suitably adjusted.

In the production method according to one embodiment of the present invention, the lower limit on the content of the alkoxysilane or condensate thereof in the liquid (B) is not particularly limited, but is, in terms of further enhancing the concentration of silica in the reaction liquid and further improving the productivity, preferably 50 mass % or more, more preferably 60 mass % or more, and still more preferably 70 mass % or more based on the total amount of the liquid (B) (100 mass %). In addition, the upper limit on the alkoxysilane or condensate thereof in the liquid (B) is not particularly limited, but is, in terms of allowing the silica sol synthesis reaction to proceed more mildly, thereby further suppressing the formation of a gel-like product, and also in terms of miscibility, preferably 98 mass % or less, more preferably 95 mass % or less, and still more preferably 90 mass % or less based on the total mass of the liquid (B) (100 mass %).

In addition, the lower limit on the content of the second organic solvent in the liquid (B) is not particularly limited, but is, in terms of allowing the silica sol synthesis reaction to proceed more mildly, thereby further suppressing the formation of a gel-like product, and also in terms of miscibility, preferably 2 mass % or more, more preferably 5 mass % or more, and still more preferably 10 mass % or more based on the total mass of the liquid (B) (100 mass %). In addition, the upper limit on the content of the second organic solvent in the liquid (B) is not particularly limited, but is, in terms of further enhancing the concentration of silica in the reaction liquid and further improving the productivity, preferably 50 mass % or less, more preferably 40 mass % or less, and still more preferably 30 mass % or less.

[Liquid (C) Containing Water]

In the method for producing a silica sol according to one embodiment of the present invention, in terms of minimizing the contamination with metal impurities and the like, it is preferable that water in the liquid (C) containing water for use in the synthesis of a silica sol is pure water or ultrapure water. In addition, the liquid (C) can also contain other components in addition to water without interfering with the effects of the present invention. However, it is preferable that the liquid (C) contains substantially no alkali catalyst, and it is particularly preferable that an alkali catalyst is not contained at all, that is, its content is 0 mass % based on the total mass of the liquid (C). When the liquid (C) contains substantially no alkali catalyst, a lack of uniformity in the alkali catalyst concentration in the reaction liquid can be suppressed, and the suppressing effect on the formation of fine particles can be enhanced. Incidentally, as used herein, "containing substantially no alkali catalyst" means that the content is 1 ppm or less based on the total mass of the liquid. Here, when the content of the alkali catalyst is 1 ppm or less based on the total mass of the liquid, such an alkali catalyst is treated as unintentionally incorporated impurities, and even when such a liquid is added after the start of the synthesis until the finish time of the synthesis, such addition is not regarded as additional supply of an alkali catalyst.

The lower limit on the pH value of the liquid (C) is not particularly limited, but is, in terms of further suppressing the gelation of the reaction liquid, preferably 5.0 or more, more preferably 5.5 or more, still more preferably 6.0 or more, and particularly preferably 6.5 or more. In addition, the upper limit on the pH value of the liquid (C) is not particularly limited, but is preferably less than 8.0. Within this range, a lack of uniformity in the concentration of hydroxide ions in the reaction liquid is further suppressed, and the suppressing effect on the formation of fine particles can be further enhanced. Here, the pH can be measured with a desktop pH meter (Model No.: F-72) manufactured by HORIBA, Ltd., for example.

From above, as preferred examples of the liquid (C), a liquid (C1) containing water and having a pH of 5.0 or more and less than 8.0, a liquid (C2) containing water and substantially no alkali catalyst, and the like can be mentioned. Then, a liquid (C3) containing water and substantially no alkali catalyst and having a pH of 5.0 or more and less than 8.0 is more preferable.

Therefore, as an example of the method for producing a silica sol according to one embodiment of the present invention, it is preferable to include preparing a reaction liquid by mixing a liquid (B) containing an alkoxysilane or a condensate thereof and a second organic solvent and a liquid (C1) containing water and having a pH of 5.0 or more and less than 8.0 with a liquid (A) containing an alkali catalyst, water, and a first organic solvent.

Incidentally, as used herein, even if a liquid contains an alkali catalyst, when its pH is less than 8.0, such an alkali catalyst is treated as unintentionally incorporated impurities, and, even when such a liquid is added after the start of the synthesis until the finish time of the synthesis, such addition is not regarded as additional supply of an alkali catalyst.

In addition, as another example of the method for producing a silica sol according to one embodiment of the present invention, it is preferable to include a step of preparing a reaction liquid by mixing a liquid (B) containing an alkoxysilane or a condensate thereof and a second organic solvent and a liquid (C2) containing water and not containing the alkali catalyst with a liquid (A) containing an alkali catalyst, water, and a first organic solvent.

[Preparation of Reaction Liquid and Synthesis of Silica Gel]

The production method according to one embodiment of the present invention preferably includes preparing a reaction liquid by mixing an alkoxysilane or a condensate thereof, water, and an alkali catalyst. Here, in the case where a synthesis method of two-component reaction type is employed, a method for preparing the reaction liquid is not particularly limited, and may be, for example, a method in which a liquid containing an alkoxysilane or a condensate thereof and an organic solvent and a liquid containing an alkali catalyst, water, and an organic solvent are mixed, for example. In addition, in the case where a synthesis method of three-component reaction type is employed, a method for preparing the reaction liquid is not particularly limited, and may be, for example, a method in which the above liquid (B) and the above liquid (C) are mixed with the above liquid (A) to prepare a reaction liquid, for example.

In the production method according to one embodiment of the present invention, a method for mixing two components in the two-component reaction type or three components in the three-component reaction type is not particularly limited, but it is preferable that the alkoxysilane or condensate thereof is added at a constant addition rate from the start time of the synthesis of a silica sol until the finish time of the synthesis.

Incidentally, as used herein, "constant addition rate" means that the variation width of the rate of addition of the additive liquid is within a range of ±30% or less relative to the average addition rate calculated by dividing the total amount of the addition-side liquid by the time from the start time of the synthesis until the finish time of the synthesis (total mass (g) of the addition-side liquid time from the start time of the synthesis until the finish time of the synthesis (min)). For example, in the case of a method of three-component reaction type, it means that the width is within a range of ±30% or less relative to each of the average addition rates of the liquid (B) and the liquid (C) each calculated by dividing the total mass (g) of the liquid (B) or the liquid (C) added to the liquid (A) by the time from the time point when the addition is started until the time point when the addition is finished (total mass (g) of the liquid (B) or liquid (C) added time from the time point when the addition is started until the time point when the addition is finished (min)).

The alkoxysilane or condensate thereof undergoes hydrolysis and polycondensation in such a reaction liquid, whereby a silica sol is generated. The silica sol may be used as it is according to the intended use, or alternatively, may also be subjected to the below-described water displacement step or concentration step and used as the resulting liquid, or dispersed in an organic solvent and used as an organosol.

In the production method according to one embodiment of the present invention, an alkali catalyst is not additionally supplied after the start of the synthesis of a silica sol until the finish time of the synthesis. Therefore, in the case where a synthesis method of three-component reaction type is employed, the alkali catalyst is present only in the liquid (A), and no alkali catalyst is additionally supplied later.

In the method for producing a silica sol according to one embodiment of the present invention, without additionally supplying an alkali catalyst, the formation of fine particles can be significantly suppressed. The reason for this is unknown in detail, but is presumably as follows. As described above, after the start of the reaction, in the state where the reaction is stably proceeding, when the rate of decrease in the electrical conductivity is made to fall below a predetermined value, the concentration of hydroxide ions in the reaction liquid becomes approximately constant even without additionally supplying ammonia. As a result, even in the final stage of the reaction, the silica adhesion effect of hydroxide ions can be maintained, and silica particles can grow sufficiently, whereby the formation of fine particles can be suppressed.

In the case where a synthesis method of three-component reaction type is employed, the method for adding the liquid (B) and the liquid (C) at the time of mixing the liquid (B) and the liquid (C) with the liquid (A) is not particularly limited. Approximately constant amounts of the liquids may be simultaneously added to the liquid (A), or it is also possible that the liquid (B) and the liquid (C) are alternately added to the liquid (A). Alternatively, the liquid (B) and the liquid (C) may also be added at random. Among them, in terms of suppressing changes in the amount of water in the reaction liquid used for the synthesis reaction, it is preferable to use a method in which the liquid (B) and the liquid (C) are simultaneously added, and it is more preferable to use a method in which the liquid (B) and the liquid (C) are simultaneously added each at a constant addition rate.

As a method for adding the liquid (B) and the liquid (C) to the liquid (A), in terms of further suppressing a lack of uniformity in the alkali catalyst concentration in the reaction liquid, and further enhancing the suppressing effect on the formation of fine particles, it is preferable that the liquid (B) and the liquid (C) are added to the liquid (A) by divided addition or continuous addition. Here, divided addition means that when the liquid (B) and the liquid (C) are added to the liquid (A), the whole amount of the liquid (B) and the liquid (C) is added not at once, but is added in two or more portions discontinuously or continuously. As a specific example of divided addition, dropwise addition can be mentioned. In addition, continuous addition means that when the liquid (B) and the liquid (C) are added to the liquid (A), the whole amount of the liquid (B) and the liquid (C) is added not at once, but is added continuously without interrupting the addition.

The time required for adding the whole amount of the liquid (B) and the liquid (C) to the liquid (A) changes depending on the liquid amounts of the liquid (B) and the liquid (C) and thus is not particularly limited, but is preferably 10 minutes or more, more preferably 15 minutes or more, and still more preferably 20 minutes or more. Within this range, a lack of uniformity in the alkali catalyst concentration in the reaction liquid is further suppressed, and the suppressing effect on the formation of fine particles can be further enhanced. In addition, the upper limit on the time required for adding the whole amount of the liquid (B) and the liquid (C) to the liquid (A) is not particularly limited, but is preferably 300 minutes or less in terms of productivity.

From this, as a preferred method for adding the liquid (B) and the liquid (C) at the time of mixing the liquid (B) and the liquid (C) with the liquid (A), in terms of further suppressing a lack of uniformity in the alkali catalyst concentration in the reaction liquid, and further enhancing the suppressing effect on the formation of fine particles, a method in which the liquid (B) and the liquid (C) are simultaneously added each at a constant addition rate, and the addition is completed within a certain period of time or longer.

The lower limits on the temperatures of the liquid (A), the liquid (B), and the liquid (C) are not particularly limited, but are each independently preferably 0° C. or more, more preferably 10° C. or more, and still more preferably 20° C. or more. In addition, the upper limits on the temperatures of the liquid (A), the liquid (B), and the liquid (C) are each independently preferably 70° C. or less, more preferably 60° C. or less, and still more preferably 50° C. or less. That is, it is preferable that the temperatures of the liquid (A), the liquid (B), and the liquid (C) are each independently 0° C. or more and 70° C. or less. When the temperature is 0° C. or more, each liquid (liquid (A), liquid (B), liquid (C)) can be prevented from freezing. Meanwhile, when the temperature is 70° C. or less, the volatilization of organic solvents can be prevented.

In addition, the difference in temperature among the liquid (A), the liquid (B), and the liquid (C) is preferably not more than 20° C., more preferably not more than 10° C., and still more preferably 0° C. (lower limit: 0° C.). Here, the difference in temperature means the difference between the highest and lowest temperatures among the three liquids.

As used herein, in the case where a synthesis method of three-component reaction type using the liquid (A), the liquid (B) and the liquid (C) is employed, "reaction liquid" is a liquid obtained by mixing the liquid (B) and the liquid (C) with the liquid (A), and means a liquid in the state where the hydrolysis and polycondensation of the alkoxysilane or condensate thereof are about to proceed (before proceeding).

In the method for producing a silica sol according to one embodiment of the present invention, during 90% or more of the time between when 5 minutes have elapsed (when 5 minutes have elapsed from the first local maximum) from the time point when the electrical conductivity of the reaction liquid reaches a local maximum for the first time from the start of the reaction (first local-maximum time point) and the finish time of the synthesis of a silica sol, the proportion of the value of the electrical conductivity of the reaction liquid is more than 90% relative to the value of the electrical conductivity at the time when 5 minutes have elapsed from the time point when the local maximum is reached.

In the case where the proportion of the value of the electrical conductivity of the reaction liquid during the above period is 90% or less relative to the value of the electrical conductivity at the time when 5 minutes have elapsed from the first local maximum, the frequency of formation of fine particles significantly increases. In addition, in terms of further enhancing the suppressing effect on the formation of fine particles, the proportion of the value of the electrical conductivity of the reaction liquid during the above period relative to the value of the electrical conductivity at the time when 5 minutes have elapsed from the first local maximum is preferably more than 95%, and more preferably 100% or more. In addition, in terms of suppressing rapid growth of silica particles, the proportion of the value of the electrical conductivity of the reaction liquid during the above period relative to the value of the electrical conductivity at the time when 5 minutes have elapsed from the first local maximum is preferably 200% or less.

The reason why the formation of fine particles is significantly suppressed by making the rate of decrease in the electrical conductivity of the reaction liquid during the silica sol synthesis fall below a predetermined value is unknown in detail, but is presumably as follows. As described above, the electrical conductivity of the reaction liquid is correlated to the ion concentration in the reaction liquid, and when the rate of decrease in the electrical conductivity is made to fall below a predetermined value, and the electrical conductivity is maintained at or higher than a predetermined proportion, the rate of decrease in the concentration of hydroxide ions also falls below a predetermined value. As a result, even in the final stage of the reaction, the silica adhesion effect of hydroxide ions can be maintained, and silica particles can grow sufficiently, whereby the formation of fine particles can be suppressed.

In addition, in the case where the proportion of the value of the electrical conductivity of the reaction liquid during the above period is 90% or less relative to the value of the electrical conductivity at the time when 5 minutes have elapsed from the first local maximum, when it is attempted to reduce the frequency of formation of fine particles even a little, it may be necessary to reduce the amount of liquid containing the alkoxysilane or condensate thereof (for example, tetramethoxysilane) added, and, in this case, the amount of silica particles synthesized per batch also decreases. However, according to the method for producing a silica sol according to one embodiment of the present invention, because the formation of fine particles is significantly suppressed, the amount of liquid containing the alkoxysilane or condensate thereof (for example, tetramethoxysilane) added can be increased, and the amount of silica particles synthesized per batch can be increased. This is also effective in that the productivity can further enhanced.

Here, the electrical conductivity (μS/cm) of the reaction liquid can be measured using Lacom Tester pH & Conductivity Meter PCWP300 manufactured by Universal Technics Co., Ltd., or the like, for example. Incidentally, the details of the measurement method will be described in the Examples.

In addition, when the time during which the proportion of the value of the electrical conductivity of the reaction liquid is more than 90% relative to the value of the electrical conductivity at the time when 5 minutes have elapsed from the first local maximum is less than 90% relative to the time between when 5 minutes have elapsed from the first local maximum to the finish time of the synthesis of a silica sol, the frequency of formation of fine particles significantly increases. In terms of further enhancing the suppressing effect on the formation of fine particles, the time is 90% or more, preferably 95% or more, and more preferably 100% (upper limit: 100%).

Relative to the total amount of the alkoxysilane or condensate thereof added from the start time of the synthesis of a silica sol until the finish time of the synthesis, the proportion (%) of the amount of alkoxysilane or condensate thereof added from the start time of the synthesis until the first local-maximum time point is preferably less than 20 mass %, more preferably 15 mass % or less, and still more preferably 10 mass % or less (lower limit: more than 0 mass %). Within this range, the suppressing effect on the formation of fine particles is further enhanced. Here, in the case where the alkoxysilane or condensate thereof is added at a constant addition rate from the start time of the synthesis of a silica sol until the finish time of the synthesis, the following can be said. For example, in the case where a synthesis method of three-component reaction type is employed, and the liquid (B) is added to the liquid (A) at a constant addition rate, the above proportion is equal to the proportion of the time from the start time of the synthesis of a silica sol until the first local-maximum time point relative to the time from the start time of the synthesis of a silica sol (start time of the addition) until the finish time of the synthesis (finish time of the addition).

In addition, relative to the total amount of the alkoxysilane or condensate thereof added between when 5 minutes have elapsed from the first local maximum and the finish time of the synthesis, the proportion (%) of the amount of the alkoxysilane or condensate thereof added during this period in the state where the proportion of the value of the electrical conductivity of the reaction liquid is more than 90% relative to the value of the electrical conductivity at the time when 5 minutes have elapsed from the first local maximum is preferably 90 mass % or more, more preferably 95 mass % or more, and still more preferably 100 mass % (upper limit: 100 mass %). Within this range, the suppressing effect on the formation of fine particles is further enhanced. Here, in the case where the alkoxysilane or condensate thereof is added at a constant addition rate from the start time of the synthesis of a silica sol until the finish time of the synthesis (or at least from when 5 minutes have elapsed from the first local maximum until the finish time of the synthesis of a silica sol), the following can be said. For example, in the case where a synthesis method of three-component reaction type is employed, and the liquid (B) is added to the liquid (A) at a constant addition rate, the above proportion is equal to the proportion (%) of, relative to the time from when 5 minutes have elapsed from the first local maximum until the finish time of the synthesis of a silica sol, the time during which the state where the proportion of the value of the electrical conductivity of the reaction liquid is more than 90% relative to the value at the time when 5 minutes have elapsed from the first local maximum is presented within this time.

The temperature of the reaction liquid is not particularly limited as long as the above electrical conductivity relationship is satisfied. Preferred values of the upper and lower limits of the temperature of the reaction liquid are the same as the preferred values of the upper and lower limits of the temperatures of the above liquid (A), the liquid (B), and the liquid (C), respectively.

The method for producing a silica sol according to one embodiment of the present invention preferably includes lowering the temperature of the reaction liquid stepwise or continuously and more preferably includes lowering the temperature of the reaction liquid continuously, during at least part of the time between the start time of the synthesis of a silica sol and the finish time of the synthesis. Incidentally, as used herein, "the temperature of a reaction liquid is lowered continuously" means that when the temperature is measured every 5 minutes, a temperature that is 0.2° C. or more lower than the temperature at the previous measurement time is confirmed.

In addition, in the production method, between when 5 minutes have elapsed from the first local maximum and the finish time of the synthesis, the time for continuously lowering the temperature of the reaction liquid is preferably 50% or more, more preferably 80% or more, of the time. Then, it is still more preferable that the method includes continuously lowering the temperature of the reaction liquid during the entire time between when 5 minutes have elapsed from the first local maximum and the finish time of the synthesis. By lowering the temperature of the reaction liquid, the suppressing effect on the formation of fine particles can be further enhanced.

When the temperature of the reaction liquid is lowered, the electrical conductivity of the reaction liquid increases. Therefore, it is preferable that the temperature of the reaction liquid is adjusted such that from when 5 minutes have elapsed from the first local maximum until the finish time of the synthesis of a silica sol, the electrical conductivity of the reaction liquid is more than 90% relative to the value of the electrical conductivity at the time when 5 minutes have elapsed from the first local maximum.

The reason why the formation of fine particles is significantly suppressed by lowering the temperature of the reaction liquid is unknown in detail, but is presumably as follows. When the temperature of the reaction liquid is lowered, the equilibrium of the above reaction formula (2) inclines to the right, the concentration of hydroxide ions increases, and the electrical conductivity of the reaction liquid increases. Then, because of an increase in the hydroxide ion concentration, even in the final stage of the reaction, the silica adhesion effect of hydroxide ions can be maintained, and silica particles can grow sufficiently, whereby the suppressing effect on the formation of fine particles is further enhanced.

The temperature of the reaction liquid can be measured using Lacom Tester pH & Conductivity Meter PCWP300 manufactured by Universal Technics Co., Ltd., or the like, for example.

In the method for producing a silica sol according to one embodiment of the present invention, the hydrolysis and the polycondensation reaction can be performed under any of the following pressure conditions: reduced pressure, atmospheric pressure, and increased pressure. However, in terms of production cost, performance under atmospheric pressure is preferable.

The molar ratio of the alkoxysilane or condensate thereof, water, the alkali catalyst, and the first and second organic solvents in the reaction liquid is not particularly limited, and can be suitably adjusted with the contents of the alkali catalyst contained in the liquid (A) or the alkoxysilane or condensate thereof contained in the liquid (B).

As described above, as used herein, in the case where a synthesis method of three-component reaction type using the liquid (A), the liquid (B) and the liquid (C) is employed, "reaction liquid" is a liquid obtained by mixing the liquid (B) and the liquid (C) with the liquid (A), and means a liquid in the state where the hydrolysis and polycondensation of the alkoxysilane or condensate thereof are about to proceed (before proceeding). Meanwhile, "silica sol" means a liquid in which hydrolysis and polycondensation have been finished.

That is, the molar ratio of water, the alkali catalyst, and the organic solvents (the total amount of the first and second organic solvents) is the molar ratio of the alkoxysilane or condensate thereof, water, the alkali catalyst, and the organic solvents (the total amount of the first and second organic solvents) contained in the whole amount of the reaction liquid when all the liquid (A), the liquid (B), and the liquid (C) used for the reaction, that is, the whole amount of the liquid (A), the liquid (B), and the liquid (C), is mixed. In plain words, it is the molar ratio in the whole amount of the reaction liquid after adding the liquid (B) and the liquid (C) to the liquid (A) (liquid (A)+liquid (B)+liquid (C)).

The molar ratio of water contained in the reaction liquid is, in the case where the number of moles of the alkoxysilane is 1.0, preferably 2.0 to 12.0 mol, and more preferably 3.0 to 6.0 mol. When the molar ratio of water is 2.0 mol or more, the amount of unreacted materials can be reduced. In addition, when the molar ratio of water is 12.0 mol or less, the concentration of silica particles in the obtained silica sol can be enhanced. Incidentally, in the case where the condensate of an alkoxysilane used is an N-mer (N represents an integer of 2 or more), the molar ratio of water in the reaction liquid is N times that in the case of using an alkoxysilane. That is, in the case where the condensate of an alkoxysilane used is a dimer, the molar ratio of water in the reaction liquid is two times that in the case of using an alkoxysilane.

The molar ratio of the alkali catalyst contained in the reaction liquid is, in the case where the number of moles of the alkoxysilane or condensate thereof is 1.0, preferably 0.1 to 1.0 mol, and more preferably 0.13 to 0.33.

That is, the amount of alkoxysilane or condensate thereof in a certain amount of alkali catalyst, that is, the molar ratio of the alkoxysilane or condensate thereof relative to the alkali catalyst (the number of moles of the alkoxysilane or condensate thereof (mol)/the number of moles of the alkali catalyst (mol)) is preferably 1 to 10, and more preferably 3 to 8. When the upper limit of the molar ratio is within the above range, the amount of unreacted materials can be reduced, and also the suppressing effect on the formation of fine particles can be further enhanced. In addition, when the lower limit of the molar ratio is within the above range, the reaction stability can be improved, and also the amount of silica synthesized per batch is further increased, whereby the productivity can be further enhanced. In the production method according to one embodiment of the present invention, even when the amount of alkoxysilane or condensate thereof used, which serves as a raw material, is increased, the formation of fine particles is suppressed. Therefore, as application conditions for further enhancing the usefulness of the present invention, it is particularly preferable that the ratio of the number of moles of the alkoxysilane or condensate thereof relative to the number of moles of the alkali catalyst is adjusted to be within the above range.

The molar ratio of the total amount of the first and second organic solvents contained in the reaction liquid is, in the case where the number of moles of the alkoxysilane or condensate thereof is as 1.0, preferably 2.0 to 20.0 mol, and more preferably 4.0 to 17.0 mol. When the molar ratio of the organic solvents is 2.0 mol or more, the amount of unreacted materials can be reduced. In addition, when the molar ratio of the organic solvents is 20.0 mol or less, the concentration of silica particles in the obtained silica sol can be enhanced.

That is, it is preferable that the molar ratio of the alkoxysilane, water, the alkali catalyst, and the first and second organic solvents in the reaction liquid is (alkoxysilane):(water):(alkali catalyst):(organic solvent)=(1.0):(2.0 to 12.0):(0.1 to 1.0):(2.0 to 20.0). In addition, it is preferable that the molar ratio of the alkoxysilane condensate, water, the alkali catalyst, and the first and second organic solvents in the reaction liquid is, in the case where the alkoxysilane condensate is an N-mer (N represents an integer of 2 or more), (alkoxysilane condensate):(water):(alkali catalyst):(organic solvent)=(1.0):(2.0×N to 12.0×N):(0.1 to 1.0):(2.0 to 20.0).

[Post-Treatment]

In the method for producing a silica sol according to one embodiment of the present invention, in addition to the preparation of the above reaction liquid, the post-treatment described below may also be performed.

Specifically, the method may further include, after the preparation of the reaction liquid and the synthesis reaction, at least one of displacing the organic solvents present in the silica sol with water and concentrating the silica sol. More specifically, it is possible to perform only the concentration of the silica sol, or perform only the displacement of the organic solvents in the silica sol with water. In addition, after concentration, the organic solvents in the concentrated liquid may be displaced with water, or, after water displacement, the water-displaced liquid may be concentrated. Concentration may be performed several times, and, in such a case, water displacement may be performed between concentration and concentration. For example, it is possible that after concentration, the organic solvents in the concentrated liquid are displaced with water, and the water-displaced liquid is further concentrated.

(Water Displacement)

The method for producing a silica sol according to one embodiment of the present invention may further include, after the preparation of the reaction liquid and the synthesis reaction, displacing the organic solvents contained in the silica sol with water. It is preferable that water displacement is performed on a silica sol that has undergone concentration (concentrated silica sol).

When the organic solvents in the silica sol are displaced with water, in the case where ammonia is selected as an alkali catalyst, the pH of the silica sol can be adjusted to a neutral region. At the same time, unreacted materials contained in the silica sol are removed, whereby a water-displaced silica sol stable over a long period of time can be obtained.

As the method for displacing the organic solvents in the silica sol with water, a known method can be used. For example, a method in which water is added while maintaining the liquid amount of the silica sol at or higher than a certain amount, and displacement is performed by heating distillation, can be mentioned. In this case, it is preferable that the displacement operation is performed until the liquid temperature and the column top temperature reach the boiling point of water for displacement.

As water used in water displacement, in terms of minimizing the contamination with metal impurities and the like, it is preferable to use pure water or ultrapure water.

In addition, as a method for displacing the organic solvents in the silica sol with water, a method in which the silica sol is centrifuged to separate silica particles, followed by re-dispersion in water, can also be mentioned.

(Concentration Step)

The method for producing a silica sol according to one embodiment of the present invention may further include, after the preparation of the reaction liquid and the synthesis reaction, further concentrating the silica sol. Incidentally, the silica sol of this mode also includes a mode of a silica sol that has undergone water displacement (water-displaced silica sol).

The method for concentrating a silica sol is not particularly limited, and a known method can be used. For example, a heating concentration method, a membrane concentration method, and the like can be mentioned.

According to the heating concentration method, the silica sol is heated and concentrated under atmospheric pressure or under reduced pressure, whereby a concentrated silica sol can be obtained.

According to the membrane concentration method, for example, the silica sol can be concentrated by membrane separation using an ultrafiltration method capable of filtrating silica particles. The molecular weight cutoff of the ultrafiltration membrane is not particularly limited, and the molecular weight cutoff can be selected according to the size of generated particles. The material that forms the ultrafiltration membrane is not particularly limited, and polysulfone, polyacrylnitrile, sintering metal, ceramic, carbon, and the like can be mentioned, for example. The form of the ultrafiltration membrane is not particularly limited, and a spiral type, a tubular type, a hollow fiber type, and the like can be mentioned. In the ultrafiltration method, the operating pressure is not particularly limited, and can be set to be equal to or lower than the working pressure of the ultrafiltration membrane used.

<Silica Sol>

The volume average particle size of silica particles in the silica sol produced by the above production method is not particularly limited, but is preferably 3 to 500 nm, more preferably 5 to 300 nm, still more preferably 10 to 200 nm, and particularly preferably more than 30 nm and 200 nm or less.

Incidentally, as used herein, "fine particles" means particles having a particle size that is 40% or less of the volume average particle size determined by SEM image analysis and also is 30 nm or less.

The proportion of the number of fine particles is not particularly limited, and is preferably 10% or less based on the total number of silica particles. The proportion is more preferably 5% or less, and still more preferably 0%, that is, no such particles are observed (lower limit: 0%).

As a preferred example of silica particles contained in the silica sol produced by the above production method, particles having a volume average particle size of 10 to 200 nm (more preferably more than 30 nm and 200 nm or less), in which the proportion of the number of fine particles having a particle size that is 40% or less of the volume average particle size and is 30 nm or less is 10% or less of the total number of the silica particles, for example, can be mentioned.

Here, the volume average particle size of silica particles in the silica sol and the proportion of the number of fine particles based on the total number of silica particles can be calculated by the following method, for example. First, from an SEM image taken using a scanning electron microscope (SEM) SU8000 manufactured by Hitachi High-Technologies Corporation, 400 silica particles are counted using image-analysis particle size distribution software Mac-View Ver. 4 (manufactured by Mountech Co., Ltd.), and, based on the Heywood diameter (equivalent-circle diameter), the size of each of particles and their volume average particle size are calculated. Subsequently, of 400 silica particles, the number of fine particles having a particle size that is 40% or less of the volume average particle size determined by SEM image analysis and is 30 nm or less is checked. Then, the proportion of the number of fine particles relative to the 400 silica particles is calculated as the proportion (%) of the number of fine particles based on the total number of silica particles. Incidentally, the details of the measurement method will be described in the Examples.

The shape of silica particles in the silica sol is not particularly limited, and may be spherical or non-spherical.

The concentration of silica particles in the silica sol produced by the above production method (concentration of silica in the reaction liquid) changes depending on the particle size of the obtained silica particles and is not particularly limited, but is preferably 5 mass % or more and 25 mass % or less, more preferably 7 mass % or more and 20 mass % or less, and still more preferably 9 mass % or more and 15 mass % or less.

The pH of the silica sol produced by the production method according to one embodiment of the present invention is not particularly limited, but is preferably 7.0 to 13.0, and more preferably 8.0 to 12.0.

According to the production method according to one embodiment of the present invention, the total content of metal impurities contained in the silica sol, for example, metal impurities such as Al, Ca, B, Ba, Co, Cr, Cu, Fe, Mg, Mn, Na, Ni, Pb, Sr, Ti, Zn, Zr, U, and Th, is not particularly limited, but is preferably 1 ppm or less. Embodiments of the present invention have been described in detail. However, they are illustrative and exemplary, but not restrictive, and the scope of the present invention is clearly to be determined from the attached Claims.

The present invention encompasses the following embodiments and modes:

1. A method for producing a silica sol, including synthesizing a silica sol by, in a reaction liquid containing an alkoxysilane or a condensate thereof, water, and an alkali catalyst, allowing the alkoxysilane or condensate thereof to react with the water in the presence of the alkali catalyst, wherein the alkali catalyst is not additionally supplied after the start of the synthesis until the finish time of the synthesis, and during 90% or more of the time between when 5 minutes have elapsed from the time point when the electrical conductivity of the reaction liquid reaches a local maximum for the first time from the start of the reaction and the finish time of the synthesis, the proportion of the value of the electrical conductivity of the reaction liquid is more than 90% relative to the value of the electrical conductivity at the time when 5 minutes have elapsed from the time point when the local maximum is reached;

2. The method for producing a silica sol according to 1. above, including, during at least part of the time between the start time of the synthesis and the finish time of the synthesis, lowering the temperature of the reaction liquid stepwise or continuously;

3. The method for producing a silica sol according to 2. above, including, during the entire time between when 5 minutes have elapsed from the time point when the electrical conductivity of the reaction liquid reaches a local maximum for the first time and the finish time of the synthesis, lowering the temperature of the reaction liquid continuously;

4. The method for producing a silica sol according to any one of 1. to 3. above, wherein, relative to the total amount of the alkoxysilane or condensate thereof added between when 5 minutes have elapsed from the time point when the electrical conductivity of the reaction liquid reaches a local maximum for the first time and the finish time of the synthesis, the proportion (%) of the amount of the alkoxysilane or condensate thereof added during this period in the state where the proportion of the value of the electrical conductivity of the reaction liquid is more than 90% relative to the value of the electrical conductivity at the time when 5 minutes have elapsed from the time point when the electrical conductivity of the reaction liquid reaches a local maximum for the first time is 90 mass % or more;

5. The method for producing a silica sol according to any one of 1. to 4. above, wherein the alkoxysilane or condensate thereof is added at a constant addition rate between the start time of the synthesis and the finish time of the synthesis;

6. The method for producing a silica sol according to any one of 1. to 5. above, wherein, relative to the total amount of the alkoxysilane or condensate thereof added between the start time of the synthesis and the finish time of the synthesis, the proportion (%) of the amount of the alkoxysilane or condensate thereof added between the start time of the synthesis and the time point when the electrical conductivity of the reaction liquid reaches a local maximum for the first time is less than 20 mass %;

7. The method for producing a silica sol according to any one of 1. to 6. above, including preparing the reaction liquid by mixing:
   a liquid (B) containing the alkoxysilane or condensate thereof and a second organic solvent; and
   a liquid (C1) containing the water and having a pH of 5.0 or more and less than 8.0; with
   a liquid (A) containing the alkali catalyst, the water, and a first organic solvent;

8. The method for producing a silica sol according to any one of 1. to 6. above, including preparing the reaction liquid by mixing:
   a liquid (B) containing the alkoxysilane or condensate thereof and a second organic solvent; and
   a liquid (C2) containing the water and not containing the alkali catalyst; with
   a liquid (A) containing the alkali catalyst, the water, and a first organic solvent;

9. The method for producing a silica sol according to any one of 1. to 8. above, wherein
   silica particles included in the silica sol have a volume average particle size of 10 nm or more and 200 nm or less, and
   the proportion of the number of fine particles having a particle size that is 40% or less of the volume average particle size and is 30 nm or less is 10% or less of the total number of the silica particles.

10. The method for producing a silica sol according to any one of 1. to 9. above, wherein the alkali catalyst is ammonia.

EXAMPLES

The present invention will be described in further detail using the following examples and comparative examples. However, the technical scope of the present invention is not limited only to the following examples. Incidentally, unless otherwise noted, "%" and "parts" mean "% by mass" and "parts by mass", respectively. In addition, in the following Examples, unless otherwise noted, the operations were performed under conditions of room temperature (25° C.)/relative humidity 40 to 50% RH.

Preparation of Silica Sol

Example 1

(Preparation of Silica Sol)

To a liquid (A) obtained by mixing 97 g of water and 58 g of 29 mass % aqueous ammonia with 976 g of methanol, the addition of a liquid (B) obtained by dissolving 190 g of methanol and 506 g of tetramethoxysilane (TMOS) and a liquid (C) which is 119 g of pure water (pH=7.85) was started to prepare a reaction liquid. The synthesis reaction was allowed to proceed, then the addition was finished to complete the synthesis reaction, thereby giving a silica sol.

Here, in the preparation of the reaction liquid, the temperature of each liquid before mixing was maintained at 35° C., and the whole amount of the liquid (B) and the liquid (C) was simultaneously added to the liquid (A) each at a constant addition rate over 75 minutes while adjusting the temperature such that the temperature of the reaction liquid decreased from 35° C., which is the initial reaction temperature at the start time of the addition of the liquid (B) and the liquid (C) to the liquid (A) (start time of the synthesis), to 24.5° C., which is the final reaction temperature at the finish time of the addition (finish time of the synthesis). Here, it was confirmed that of the addition time of 75 minutes, from the start time of the addition to when 6.5 minutes had elapsed, the temperature increased due to the reaction heat. Subsequently, it was confirmed that during 68.5 minutes from when 6.5 minutes had elapsed from the start time of the addition to the finish of the synthesis, the temperature continuously decreased.

In addition, the pH of the liquid (C) was measured with a desktop pH meter (Model No.: F-72) manufactured by HORIBA, Ltd.

(Concentration of Silica Sol)

Under atmospheric pressure and at a temperature where the silica sol turned into a boiling state, the silica sol obtained above was heated until the concentration of silica reached 20 mass %, thereby giving a heat-concentrated silica sol.

(Water Displacement of Silica Sol)

While maintaining the liquid amount of the heat-concentrated silica sol obtained above at or higher than a certain level, pure water was added, followed by heating distillation, whereby the organic solvent in the heat-concentrated silica sol was displaced with pure water, thereby giving a water-displaced silica sol. Here, the heating distillation was performed as follows. Under atmospheric pressure and in a boiling state, heating was performed until the liquid temperature stopped increasing, and 1,780 g of pure water was added to the whole amount of the reaction liquid, followed by distillation.

Comparative Example 1

The preparation of a silica sol, the heating concentration of the silica sol, and the water displacement of the silica sol were performed in the same manner as in Example 1, except that in the preparation of a silica sol in Example 1, the temperature of the reaction liquid at the start time of the addition (start time of the synthesis) was set at 35° C., a decrease in the temperature between the start time of the addition and the finish time of the addition (finish time of the synthesis) was suppressed, and, while adjusting the temperature to be as constant as possible, the liquid (B) and the liquid (C) were added to the liquid (A), thereby giving a silica sol.

(Measurement of Temperature of Reaction Liquid and Electrical Conductivity of Reaction Liquid)

In the preparation of a silica sol described above, using Lacom Tester pH & Conductivity Meter PCWP300 (manufactured by Universal Technics Co., Ltd.), the electrodes of this device were immersed in the reaction liquid, and the temperature of the reaction liquid and the electrical conductivity (μS/cm) of the reaction liquid were measured every 0.25 minutes from the start time of the addition (start time of the synthesis). The rate of change in electrical conductivity was calculated based on the following formula.

(Rate of change in electrical conductivity) (%)= [(electrical conductivity at a noted time between when 5 minutes have elapsed from the first local maximum and the finish time of the synthesis)/(electrical conductivity at the time when 5 minutes have elapsed from the first local maximum)]×100   [Equation 1]

Incidentally, in Example 1 and Comparative Example 1, the first local-maximum time point was when 1.5 minutes had elapsed from the start of the synthesis in each case, and the time point when 5 minutes had elapsed from the first local maximum was when 6.5 minutes have elapsed from the start of the synthesis in each case.

With respect to the silica sol production methods according to Example 1 and Comparative Example 1, the amount of raw materials used and the reaction conditions are summarized in Table 1 below. Incidentally, in Table 1 below, the minimum valve of the rate of change in electrical conductivity between when 5 minutes have elapsed from the first local maximum and the finish time of the synthesis is shown as "electrical conductivity maintenance range (%)".

Figure 1B:
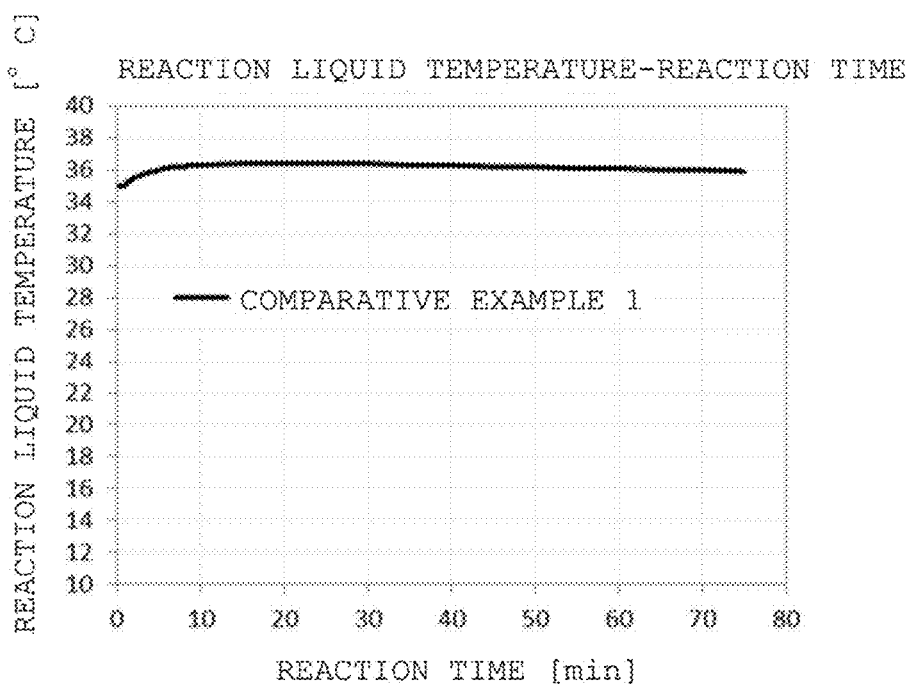
FIG. 1B is a reaction liquid temperature-reaction time graph in the production method according to Comparative Example 1.
Figure 2A:
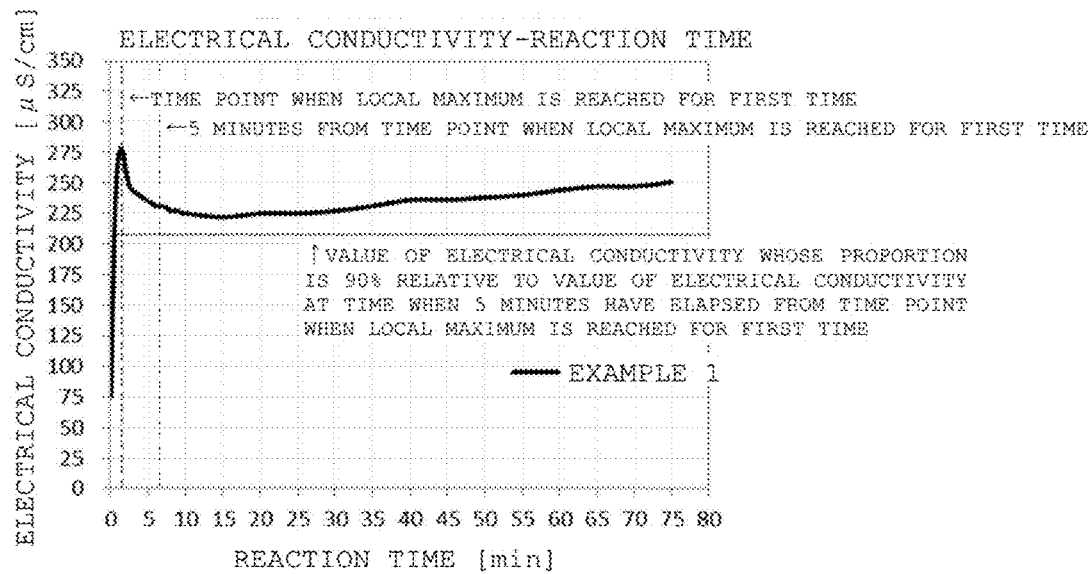
FIG. 2A is an electrical conductivity-reaction time graph in the production method according to Example 1.
Figure 2B:
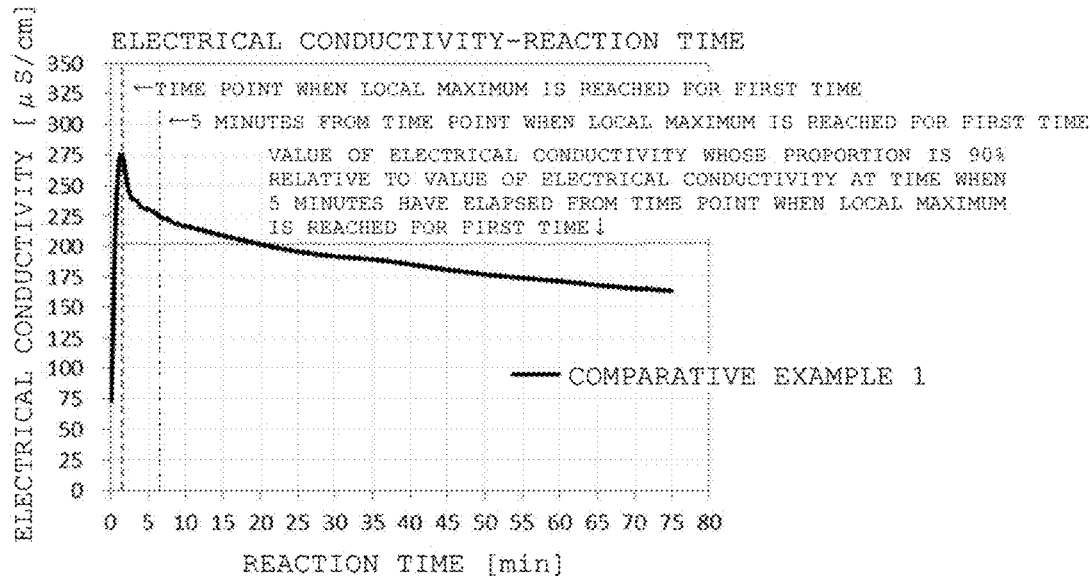
FIG. 2B is an electrical conductivity-reaction time graph in the production method according to Comparative Example 1.

Reaction liquid temperature-reaction time graphs in the production methods according to Example 1 and Comparative Example 1 are shown in FIG. 1A and FIG. 1B, and electrical conductivity-reaction time graphs in the production methods according to Example 1 and Comparative Example 1 are shown in FIG. 2A and FIG. 2B, respectively. Here, FIG. 1A shows the reaction liquid temperature-reaction time in Example 1, and FIG. 1B shows the reaction liquid temperature-reaction time in Comparative Example 1. In addition, FIG. 2A shows the electrical conductivity-reaction time in Example 1, and FIG. 2B shows the electrical conductivity-reaction time in Comparative Example 1.

In addition, in Example 1 and Comparative Example 1, the liquid (B) and the liquid (C) is added at a constant addition rate to the liquid (A).

Here, relative to the time from when 5 minutes have elapsed from the first local maximum until the finish time of the synthesis of a silica sol, the proportion (%) of the time during which the state where the proportion of the value of the electrical conductivity of the reaction liquid is more than 90% relative to the value of the electrical conductivity at the time when 5 minutes have elapsed from the first local maximum is presented is shown in Table 1 below as "proportion of time with no decrease in electrical conductivity".

In addition, the proportion (%) of, relative to the time from when 5 minutes have elapsed from the first local maximum until the finish time of the synthesis of a silica sol, the time during which the state where the proportion of the value of the electrical conductivity of the reaction liquid is more than 90% relative to the value of the electrical conductivity at the time when 5 minutes have elapsed from the first local maximum is presented is equal to the following proportion. That is, it is equal to the proportion (%) of, relative to the total amount of the alkoxysilane or condensate thereof added between when 5 minutes have elapsed from the first local maximum and the finish time of the synthesis of a silica sol, the amount of the alkoxysilane or condensate thereof added during this period in the state where the proportion of the value of the electrical conductivity of the reaction liquid is more than 90% relative to the value of the electrical conductivity at the time when 5 minutes have elapsed from the first local maximum. The proportion of the amount of alkoxysilane or condensate thereof is shown in Table 1 below as "addition proportion of TMOS in the state with no decrease in electrical conductivity".

In addition, the ratio of the number of moles of TMOS in the liquid (B) to the number of moles of ammonia in the liquid (A) in the production methods according to Example 1 and Comparative Example 1 is shown as "molar ratio of TMOS to ammonia" in Table 2. In the calculation, the molar mass of ammonia was defined as 17 g/mol, and the molar mass of TMOS was defined as 152.25 g/mol.

Further, the concentration of silica (mass %) in the reaction liquid calculated by the following equation in the case where all TMOS is used for the synthesis of silica is shown in Table 2. In the calculation, the molar mass of ammonia was defined as 17 g/mol, the molar mass of TMOS was defined as 152.25 g/mol, and the molar mass of silica was defined as 60.1 g/mol.

(Concentration of silica in the reaction liquid) (%)={[(the number of moles of TMOS in the liquid (B)) (mol)×(molar mass of silica (SiO$_2$)) (g/mol)]/(total mass (g) of the liquid (A), the liquid (B), and the liquid (C))}×100   [Equation 2]

<Evaluation of Silica Sol>

(Calculation of Volume Average Particle Size of Silica Particles)

The silica sol obtained above was dispersed in alcohol, then dried, and installed under a scanning electron microscope (SEM) SU8000 (manufactured by Hitachi High-Technologies Corporation), followed by electron beam irradiation at 5.0 kV. At a magnification of 50,000, SEM images of several visual fields were taken such that the total number of silica particles was 400 or more.

Next, from the SEM images taken above, 400 silica particles were counted using image-analysis particle size distribution software Mac-View Ver. 4 (manufactured by Mountech Co., Ltd.). Subsequently, based on the Heywood diameter (equivalent-circle diameter), the particle size of each of silica particles and their volume average particle size were calculated.

(Calculation of Proportion of the Number of Fine Particles in Silica Particles)

In the above calculation of the volume average particle size of silica particles, of the 400 silica particles, the number of fine particles having a particle size that is 40% or less of the volume average particle size determined by SEM image analysis and is 30 nm or less was checked. Then, the proportion of the number of fine particles relative to the 400 silica particles was calculated as the proportion (%) of the number of fine particles based on the total number of silica particles.

Figure 3A:
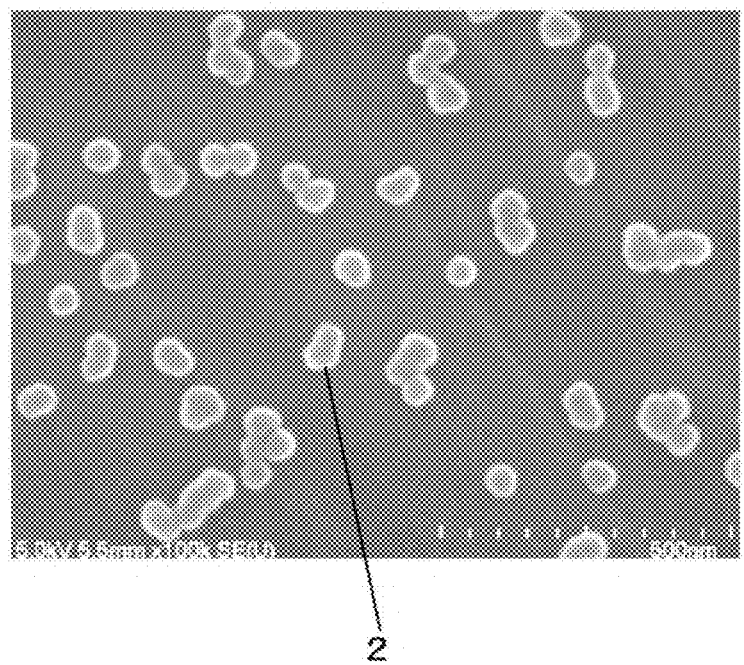
FIG. 3A is an SEM image of silica particles contained in a silica sol produced by the production method according to Example 1. Here, 2 indicates silica particles that are not fine particles (main particles)
Figure 3B:
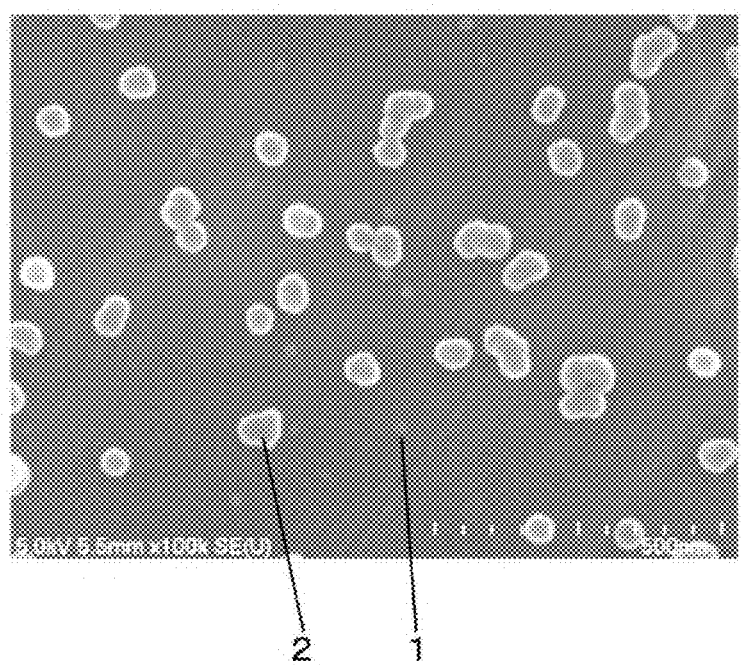
FIG. 3B is an SEM image of silica particles contained in a silica sol produced by the production method according to Comparative Example 1. Here, 1 indicates silica fine particles, and 2 indicates silica particles that are not fine particles (main particles).

FIG. 3A and FIG. 3B show SEM images of silica particles contained in silica sols produced by the production methods according to Example 1 and Comparative Example 1. Here, FIG. 3A shows an SEM image of silica particles in Example 1, and FIG. 3B shows an SEM image of silica particles in Comparative Example 1. Incidentally, in FIGS. 3A and 3B, 1 indicates silica fine particles, and 2 indicates silica particles that are not fine particles (main particles).

The evaluation results of the silica sols produced by the silica sol production methods according to Example 1 and Comparative Example 1 are shown in Table 3 below.

TABLE 1

Amount of Raw Materials Used and Reaction Conditions in Silica Sol Production

| | Liquid (A) [g] | | | Liquid (B) [g] | | Liquid (C) [g] Pure water | Initial reaction temperature [°C.] | Final reaction temperature [°C.] | Reaction time [min] | Electrical conductivity maintenance range [%] | Proportion of time with no decrease in electrical conductivity [%] | Addition proportion of TMOS in the state with no decrease in electrical conductivity [%] |
|---|---|---|---|---|---|---|---|---|---|---|---|---|
| | Methanol | Pure water | 29 mass % aqueous ammonia | TMOS | Methanol | | | | | | | |
| Example 1 | 976 | 97 | 58 | 506 | 190 | 119 | 35.0 | 24.5 | 75 | 96% | 100 | 100 |
| Comparative Example 1 | 976 | 97 | 58 | 506 | 190 | 119 | 35.0 | 35.9 | 75 | 73% | 20 | 20 |

TABLE 2

TMOS Amount Relative to Ammonia, and Silica Concentration in Reaction Liquid

| | Ratio of the number of moles of TMOS to the number of moles of ammonia | Silica concentration in the reaction liquid [mass %] |
|---|---|---|
| Example 1 | 3.4 | 10.2 |
| Comparative Example 1 | 3.4 | 10.2 |

TABLE 3

Silica Sol Evaluation Results

| | Volume average particle size [nm] | Particle size of 40% volume average particle size [nm] | Proportion of the number of fine particles [%] |
|---|---|---|---|
| Example 1 | 74 | 29 | 0 |
| Comparative Example 1 | 74 | 29 | 29 |

From the results shown above in Table 1 and Table 3, it was confirmed that in the production method according to Example 1 where the electrical conductivity maintenance range is 96%, visually observable, obvious fine particles are not formed, and a silica sol with high homogeneity can be produced. Meanwhile, it was confirmed that in the production method according to Comparative Example 1 where the electrical conductivity maintenance range is 73%, visually observable, obvious fine particles are formed, the amount of fine particles formed is also large, and the produced silica sol had poor homogeneity.

In addition, from the results in Table 1 and Table 3, between the production method according to Example 1 and the production method according to Comparative Example 1, although the concentration of silica in the reaction liquid is the same, fine particles were not formed in the production method according to Example 1. From this, it was confirmed that in the production method according to Example 1, fine particles are not formed even when the amount of alkoxysilane used is increased, and a homogeneous silica sol can be produced, making it possible to improve the amount of silica produced per batch, leading to higher productivity.

This application is based on Japanese Patent Application Number No. 2019-064654 filed on Mar. 28, 2019, the contents of which are entirely incorporated herein by reference.

REFERENCE SIGNS LIST

1: Silica fine particles,
2: Silica particles that are not fine particles (main particles).

What is claimed is:

1. A method for producing a silica sol, comprising:
synthesizing a silica sol by, in a reaction liquid containing an alkoxysilane or a condensate thereof, water, and an alkali catalyst, allowing the alkoxysilane or condensate thereof to react with the water in the presence of the alkali catalyst, wherein:
the alkali catalyst is not additionally supplied after a start of the synthesis until a finish time of the synthesis;
during 90% or more of the time between when 5 minutes have elapsed from a time point when an electrical conductivity of the reaction liquid reaches a local maximum for a first time from start of a reaction and the finish time of the synthesis, a proportion of a value of the electrical conductivity of the reaction liquid is more than 90% relative to the value of the electrical conductivity at the time when 5 minutes have elapsed from the time point when the local maximum is reached; and
during 50% or more of a time between when 5 minutes have elapsed from the time point when the electrical conductivity of the reaction liquid reaches a local maximum for the first time and the finish time of the synthesis, lowering the temperature of the reaction liquid continuously.

2. The method for producing a silica sol according to claim 1, wherein, relative to a total amount of the alkoxysilane or condensate thereof added between when 5 minutes have elapsed from the time point when the electrical conductivity of the reaction liquid reaches a local maximum for the first time and the finish time of the synthesis, the proportion (%) of the amount of the alkoxysilane or condensate thereof added during this period in a state where the proportion of the value of the electrical conductivity of the reaction liquid is more than 90% relative to the value of the electrical conductivity at the time when 5 minutes have elapsed from the time point when the electrical conductivity of the reaction liquid reaches a local maximum for the first time is 90 mass % or more.

3. The method for producing a silica sol according to claim 1, wherein the alkoxysilane or condensate thereof is added at a constant addition rate between the start time of the synthesis and the finish time of the synthesis.

4. The method for producing a silica sol according to claim 1, wherein, relative to a total amount of the alkoxysilane or condensate thereof added between the start time of the synthesis and the finish time of the synthesis, the proportion (%) of an amount of the alkoxysilane or condensate thereof added between the start time of the synthesis and the time point when the electrical conductivity of the reaction liquid reaches a local maximum for the first time is less than 20 mass %.

5. The method for producing a silica sol according to claim 1, comprising preparing the reaction liquid by mixing:
   a liquid (B) containing the alkoxysilane or condensate thereof and a second organic solvent; and
   a liquid (C1) containing the water and having a pH of 5.0 or more and less than 8.0; with
   a liquid (A) containing the alkali catalyst, the water, and a first organic solvent.

6. The method for producing a silica sol according to claim 1, comprising preparing the reaction liquid by mixing:
   a liquid (B) containing the alkoxysilane or condensate thereof and a second organic solvent; and
   a liquid (C2) containing the water and not containing the alkali catalyst; with
   a liquid (A) containing the alkali catalyst, the water, and a first organic solvent.

7. The method for producing a silica sol according to claim 1, wherein:
   silica particles included in the silica sol have a volume average particle size of 10 nm or more and 200 nm or less; and
   the proportion of a number of fine particles having a particle size that is 40% or less of the volume average particle size and is 30 nm or less is 10% or less of a total number of the silica particles.

8. The method for producing a silica sol according to claim 1, wherein the alkali catalyst is ammonia.

* * * * *